(12) United States Patent
Le

(10) Patent No.: US 10,611,239 B2
(45) Date of Patent: Apr. 7, 2020

(54) AUTOMOBILE DRIVE SHAFT BUSHING

(71) Applicant: NINGBO ZHENMING SHAFT CO., LTD, Ningbo, Zhejiang (CN)

(72) Inventor: Le Le, Zhejiang (CN)

(73) Assignee: NINGBO ZHENMING SHAFT CO., LTD, Ningbo (CN)

( * ) Notice: Subject to any disclaimer, the term of this patent is extended or adjusted under 35 U.S.C. 154(b) by 77 days.

(21) Appl. No.: 16/102,902

(22) Filed: Aug. 14, 2018

(65) Prior Publication Data

US 2020/0009961 A1  Jan. 9, 2020

(30) Foreign Application Priority Data

Jul. 5, 2018  (CN) .......................... 2018 1 0728712

(51) Int. Cl.
*B60K 17/24* (2006.01)
*F16D 1/08* (2006.01)
(Continued)

(52) U.S. Cl.
CPC .............. *B60K 17/24* (2013.01); *B60K 17/22* (2013.01); *F16C 1/26* (2013.01); *F16C 3/02* (2013.01); *F16C 3/023* (2013.01); *F16C 3/03* (2013.01); *F16C 35/02* (2013.01); *F16C 35/063* (2013.01); *F16C 35/08* (2013.01); *F16C 35/10* (2013.01); *F16C 35/12* (2013.01); *F16C 43/04* (2013.01); *F16D 1/068* (2013.01); *F16D 1/0847* (2013.01); *F16C 2326/06* (2013.01)

(58) Field of Classification Search
CPC ....... B60K 17/24; B60K 17/22; F16D 1/0847; F16D 1/076; F16D 1/027; F16C 43/02; F16C 43/04; F16C 35/02; F16C 35/063; F16C 35/08; F16C 35/10; F16C 35/12; F16C 1/26; F16C 3/02; F16C 3/023; F16C 2326/06
See application file for complete search history.

(56) References Cited

U.S. PATENT DOCUMENTS

| | | | | |
|---|---|---|---|---|
| 298,317 A | * | 5/1884 | Sherman | F16C 35/063 403/261 |
| 2,227,617 A | * | 1/1941 | Yardley | F16C 35/063 384/585 |

(Continued)

FOREIGN PATENT DOCUMENTS

| | | | | |
|---|---|---|---|---|
| CN | 2756896 Y | * | 2/2006 | ............ F16C 35/073 |
| CN | 201212529 Y | * | 3/2009 | |

(Continued)

*Primary Examiner* — Paul N Dickson
*Assistant Examiner* — Kurtis Nielson

(57) ABSTRACT

The invention relates to an automobile drive shaft bushing, comprising a bushing body, wherein, a connecting cavity is arranged in the bushing body, a first annular flange and a second annular flange are arranged in the middle of the bushing body, multiple fixing holes are arranged on the peripheral surface of the first annular flange and the second annular flange, the fixing holes are communicated with the connecting cavity, the bushing body is sleeved on the drive shaft, multiple connecting holes corresponding to the fixing holes are arranged on the peripheral surface of the drive shaft. Thus, the shaft bushing and the drive shaft are connected firmly; meanwhile, two ends of the bushing body are welded to the junction of the drive shaft with a circular welding method, which ensures the sealing property of the connection between the ends of the bushing body and the drive shaft.

6 Claims, 3 Drawing Sheets

(51) Int. Cl.
*F16D 1/068* (2006.01)
*F16C 3/03* (2006.01)
*F16C 35/12* (2006.01)
*F16C 35/10* (2006.01)
*F16C 35/063* (2006.01)
*F16C 35/02* (2006.01)
*F16C 35/08* (2006.01)
*F16C 43/04* (2006.01)
*F16C 3/02* (2006.01)
*B60K 17/22* (2006.01)
*F16C 1/26* (2006.01)

(56) References Cited

U.S. PATENT DOCUMENTS

| | | | | | |
|---|---|---|---|---|---|
| 3,140,901 | A | * | 7/1964 | Young | B60K 17/24 384/536 |
| 4,273,207 | A | * | 6/1981 | Sivers | B60K 5/02 138/149 |
| 4,732,230 | A | * | 3/1988 | Sakata | B60K 17/24 180/381 |
| 4,861,173 | A | * | 8/1989 | Kemp | F16C 35/063 384/538 |
| 4,875,538 | A | * | 10/1989 | Hodgson | B60K 17/22 180/379 |
| 6,257,985 | B1 | * | 7/2001 | Ward | F16D 1/12 464/80 |
| 7,207,741 | B2 | * | 4/2007 | Gorski | F16D 1/094 29/426.1 |
| 8,439,150 | B1 | * | 5/2013 | Mesa | B60K 17/24 180/359 |
| 2006/0291764 | A1 | * | 12/2006 | Ravindra | F16C 35/063 384/541 |
| 2018/0066712 | A1 | * | 3/2018 | Nakayama | F16D 3/08 |
| 2018/0355907 | A1 | * | 12/2018 | Sakurai | F16C 9/02 |

FOREIGN PATENT DOCUMENTS

| | | | | |
|---|---|---|---|---|
| DE | 102013208568 A1 | * | 11/2014 | F16D 1/0847 |
| DE | 102016111128 A1 | * | 12/2017 | F16D 1/0847 |

* cited by examiner

AUTOMOBILE DRIVE SHAFT BUSHING

CROSS-REFERENCE TO RELATED APPLICATIONS

The present application claims the benefit of Chinese Patent Application No. 201810728712.3 filed on Jul. 5, 2018. The contents of all the above are hereby incorporated by reference.

TECHNICAL FIELD

The invention relates to the field of drive part processing, in particular to an automobile drive shaft bushing.

BACKGROUND

Bushing refers to a ring sleeve that functions as a gasket. It is an accessory fixed outside a mechanical component to achieve sealing, wear protection and other functions. An automobile drive shaft bushing is often sleeved on the automobile drive shaft and has connection and sealing functions. Nowadays, the existing automobile drive shaft bushing is not firmly connected to the automobile drive shaft, and the automobile drive shaft bushing needs to be further improved structurally.

SUMMARY OF THE INVENTION

The purpose of the invention is provide an automobile drive shaft bushing to solve the defects in the prior art.

In order to achieve the purpose, the invention is realized by the following technical scheme:

an automobile drive shaft bushing, comprising a bushing body, wherein, a connecting cavity is arranged in the bushing body, the drive shaft extends into the connecting cavity, a first annular flange and a second annular flange are arranged in the middle of the bushing body, multiple fixing holes are arranged on the peripheral surface of the first annular flange and the second annular flange, and the fixing holes are communicated with the connecting cavity;

the bushing body is sleeved on the drive shaft, multiple connecting holes corresponding to the fixing holes are arranged on the peripheral surface of the drive shaft, and the fixing holes correspond to the connecting holes one by one and are fixed by bolts.

In the automobile drive shaft bushing, the first annular flange and the second annular flange are integrally formed with the bushing body.

In the automobile drive shaft bushing, the peripheral surfaces of the bushing body on both sides of the first annular flange and the second annular flange are tapered, and the taper of the peripheral surface is 1-3°.

In the automobile drive shaft bushing, multiple fixing holes are annularly arranged on the first annular flange and the second annular flange.

In the automobile drive shaft bushing, two ends of the bushing body are welded to the junction of the drive shaft.

For the automobile drive shaft bushing, a circular welding method is adopted.

The beneficial effects of the invention are as follows: a first annular flange and a second annular flange are arranged in the middle of the bushing body, multiple fixing holes are arranged on the peripheral surface of the first annular flange and the second annular flange, the fixing holes are communicated with the connecting cavity, the bushing body is sleeved on the drive shaft, multiple connecting holes corresponding to the fixing holes are arranged on the peripheral surface of the drive shaft, the fixing holes correspond to the connecting holes one by one and are fixed by bolts. Thus, the shaft bushing and the drive shaft are connected firmly; meanwhile, two ends of the bushing body are welded to the junction of the drive shaft with a circular welding method, which ensures the sealing property of the connection between the end of the bushing body and the drive shaft.

DETAILED DESCRIPTION OF THE PREFERRED EMBODIMENT

Figure 1:
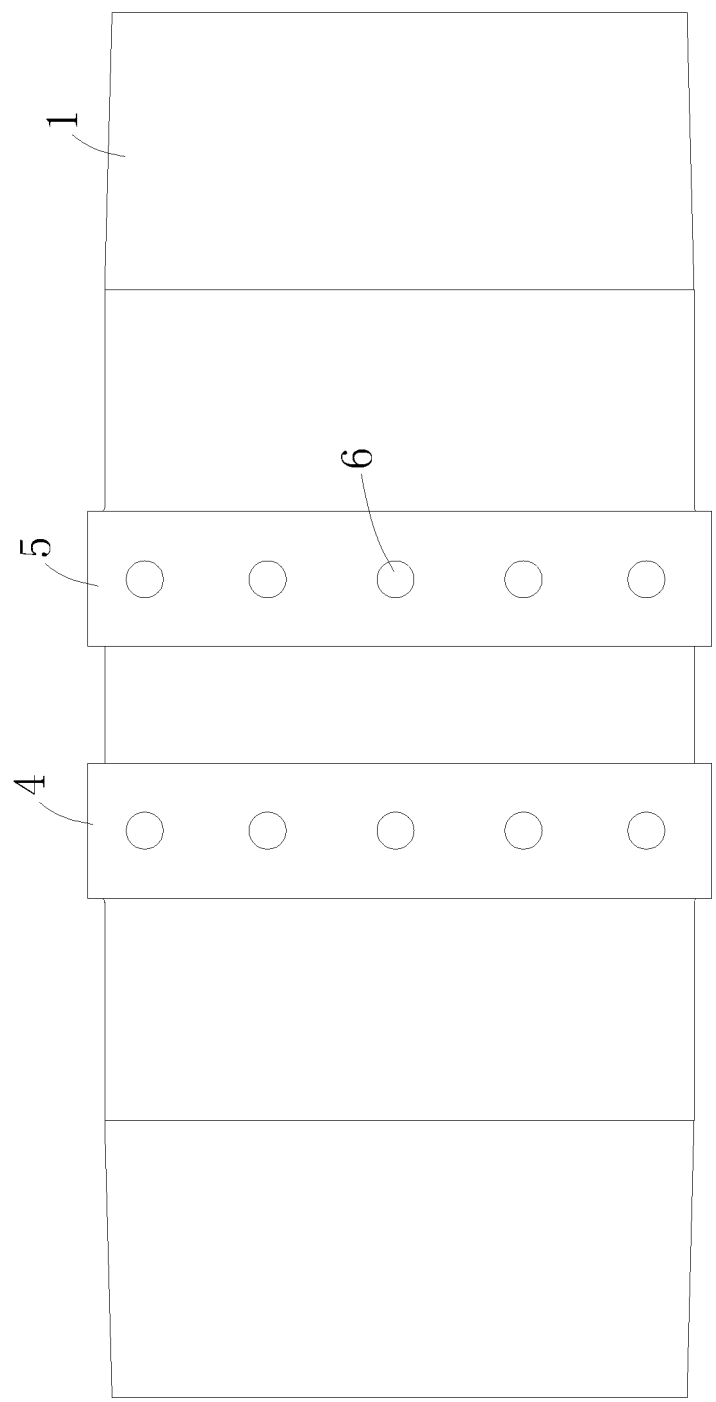
FIG. 1 is a schematic diagram of the invention.
Figure 2:
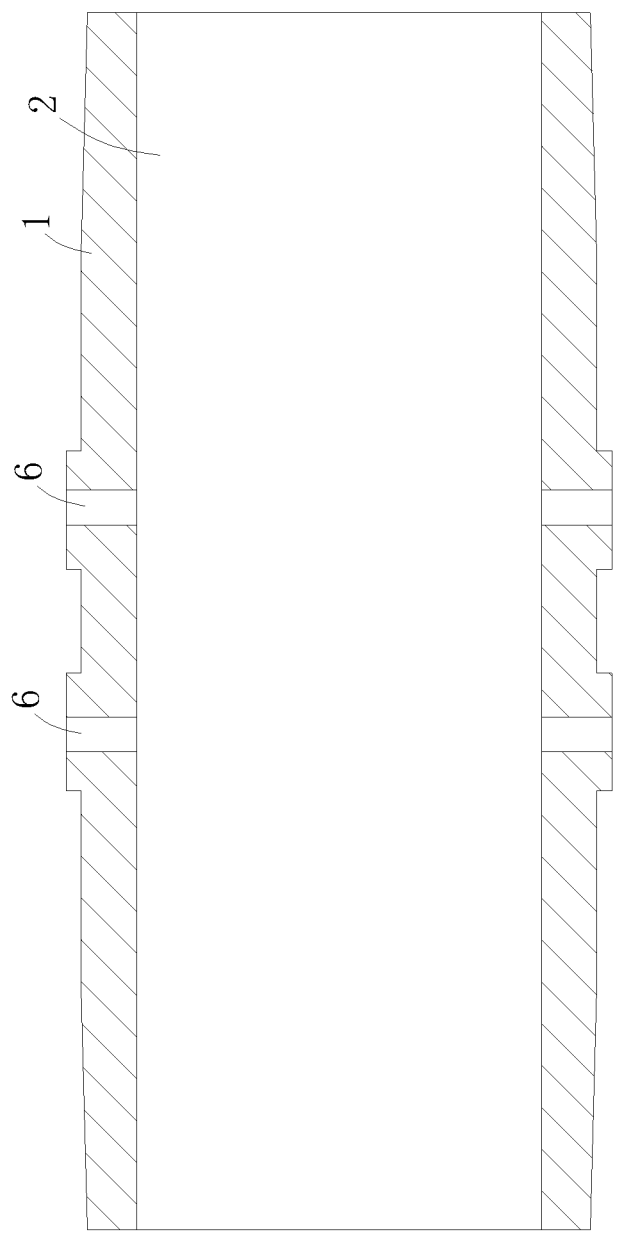
FIG. 2 is a sectional view of the invention.
Figure 3:
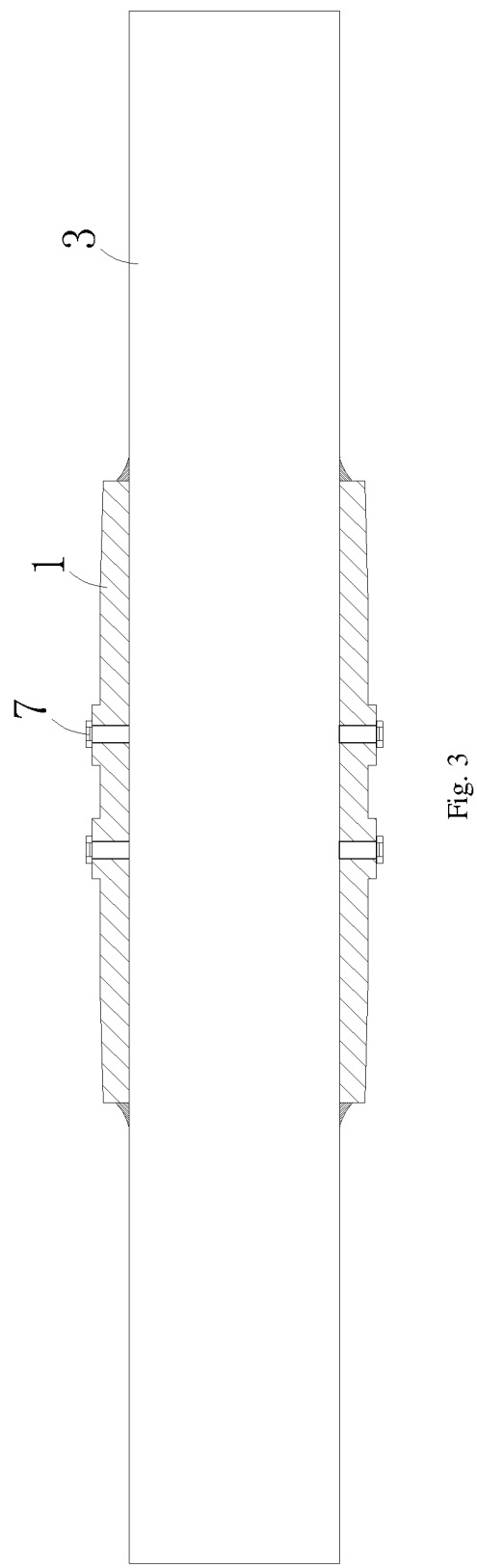
FIG. 3 is a schematic diagram of the connection between the invention and the drive shaft.

As shown in FIG. 1 to FIG. 3, an automobile drive shaft bushing comprises a bushing body 1, wherein, a connecting cavity 2 is arranged in the bushing body 1, the drive shaft 3 extends into the connecting cavity 2, a first annular flange 4 and a second annular flange 5 are arranged in the middle of the bushing body 1, multiple fixing holes 6 are arranged on the peripheral surface of the first annular flange 4 and the second annular flange 5, and the fixing holes 6 are communicated with the connecting cavity 2;

the bushing body 1 is sleeved on the drive shaft 3, multiple connecting holes corresponding to the fixing holes 6 are arranged on the peripheral surface of the drive shaft 3, and the fixing holes 6 correspond to the connecting holes one by one and are fixed by bolts 7.

In the invention, the first annular flange 4 and the second annular flange 5 are integrally formed with the bushing body 1, the peripheral surfaces of the bushing body 1 on both sides of the first annular flange 4 and the second annular flange 5 are tapered, and the taper of the peripheral surface is 1-3°.

multiple fixing holes 6 are annularly arranged on the first annular flange 4 and the second annular flange 5, two ends of the bushing body 1 are welded to the junction of the drive shaft 3, and circular welding method is used.

A first annular flange 4 and a second annular flange 5 are arranged in the middle of the bushing body, multiple fixing holes 6 are arranged on the peripheral surface of the first annular flange 4 and the second annular flange 5, the fixing holes 6 are communicated with the connecting cavity 2, the bushing body 1 is sleeved on the drive shaft 3, multiple connecting holes corresponding to the fixing holes 6 are arranged on the peripheral surface of the drive shaft 3, the fixing holes 6 correspond to the connecting holes one by one and are fixed by bolts 7. Thus, the shaft bushing and the drive shaft are connected firmly; meanwhile, two ends of the bushing body 1 are welded to the junction of the drive shaft 3 with a circular welding method, which ensures the sealing property of the connection between the end of the bushing body 1 and the drive shaft 3.

The fundamental principles, main features and advantages of the invention have been shown and described above. It should be understood by those skilled in the art that the invention is not limited to the above examples, the examples in the specification only describe the principle of the invention, and various changes and improvements can be made to the invention without departing from spirit and scope of the invention, and the changes and improvements shall fall into the protection scope of the invention. The protection scope of the invention is defined by the appended claims and their equivalents.

The invention claimed is:

1. An automobile drive shaft bushing, comprising a bushing body, wherein, a connecting cavity is arranged in the bushing body, a drive shaft extends into the connecting cavity, a first annular flange and a second annular flange are arranged in the middle of the bushing body; and characterized in that multiple fixing holes are arranged on the peripheral surface of the first annular flange and the second annular flange, and the fixing holes are communicated with the connecting cavity;

the bushing body is sleeved on the drive shaft, multiple connecting holes corresponding to the fixing holes are arranged on the peripheral surface of the drive shaft, and the fixing holes correspond to the connecting holes one by one and are fixed by bolts.

2. The automobile drive shaft bushing according to claim 1, characterized in that the first annular flange and the second annular flange are integrally formed with the bushing body.

3. The automobile drive shaft bushing according to claim 1, characterized in that the peripheral surfaces of the bushing body on both sides of the first annular flange and the second annular flange are tapered, and the taper of the peripheral surface is 1-3°.

4. The automobile drive shaft bushing according to claim 1, characterized in that multiple fixing holes are annularly arranged on the first annular flange and the second annular flange.

5. The automobile drive shaft bushing according to claim 1, characterized in that two ends of the bushing body are welded to the junction of the drive shaft.

6. The automobile drive shaft bushing according to claim 5, characterized in that a circular welding method is adopted.

* * * * *